(12) United States Patent
Hattori et al.

(10) Patent No.: US 10,048,099 B2
(45) Date of Patent: *Aug. 14, 2018

(54) METALLIC DECORATIVE PART FOR VEHICLE DISPLAY DEVICE, AND VEHICLE DISPLAY DEVICE

(71) Applicant: Yazaki Corporation, Tokyo (JP)

(72) Inventors: Tatsuya Hattori, Shizuoka (JP); Sunao Fujita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,862

(22) Filed: Oct. 18, 2016

(65) Prior Publication Data

US 2017/0106810 A1 Apr. 20, 2017

(30) Foreign Application Priority Data

Oct. 19, 2015 (JP) .................................. 2015-205788

(51) Int. Cl.
*G01D 13/04* (2006.01)
*B44C 5/04* (2006.01)
(Continued)

(52) U.S. Cl.
CPC ........... *G01D 13/04* (2013.01); *B44C 5/0415* (2013.01); *B60K 35/00* (2013.01); *B60K 37/02* (2013.01);
(Continued)

(58) Field of Classification Search
None
See application file for complete search history.

(56) References Cited

U.S. PATENT DOCUMENTS 4,264,664 A * 4/1981 Kunz ..................... E06B 9/24
160/238
5,261,349 A * 11/1993 Iino ....................... B60K 35/00
116/289

(Continued)

FOREIGN PATENT DOCUMENTS

JP 2003159900 A * 6/2003
JP 2004301995 A * 10/2004

(Continued)

OTHER PUBLICATIONS

NPL on RFID transponder. RFID Journal, 2008, retrieved on Apr. 28, 2017 from http://www.rfidjournal.com/articles/view?4525.*

(Continued)

*Primary Examiner* — Z. Jim Yang
(74) *Attorney, Agent, or Firm* — Kenealy Vaidya LLP

(57) ABSTRACT

A metallic decorative part for a vehicle display device includes a substrate body molded from a synthetic resin, a metal thin film that is formed of metal and deposited on a surface of the substrate body, and a plurality of grooves deposited on a surface of the metal thin film in accordance with a shape of the surface of the substrate body. The grooves are formed so that a width is larger than 0 and equal to or smaller than 3.0 μm, and a height is larger than 0 and equal to or smaller than 1.0 μm. Accordingly, the metallic decorative part for a vehicle display device can properly secure a metallic texture recognized by a viewer with a configuration in which the metal thin film is deposited on the surface of the substrate body made of resin.

5 Claims, 6 Drawing Sheets

US 10,048,099 B2

Page 2

(51) Int. Cl.
  *B60K 35/00* (2006.01)
  *B60R 13/00* (2006.01)
  *G09F 21/04* (2006.01)
  *B60K 37/02* (2006.01)

(52) U.S. Cl.
  CPC ............ *B60R 13/005* (2013.01); *G09F 21/04* (2013.01); *B60K 2350/20* (2013.01); *B60K 2350/40* (2013.01); *B60K 2350/402* (2013.01); *Y10T 428/1241* (2015.01); *Y10T 428/12438* (2015.01); *Y10T 428/12472* (2015.01); *Y10T 428/24545* (2015.01)

(56) References Cited

U.S. PATENT DOCUMENTS

| | | | |
|---|---|---|---|
| 5,316,359 A * | 5/1994 | Lansinger | B60K 37/00 180/90 |
| 5,624,076 A * | 4/1997 | Miekka | B22F 1/0007 164/46 |
| 5,919,551 A * | 7/1999 | Cobb, Jr. | G02B 5/00 359/530 |
| 5,949,346 A * | 9/1999 | Suzuki | B60K 37/02 116/286 |
| 6,490,776 B1 * | 12/2002 | Gager | B60K 37/02 180/90 |
| 8,617,690 B2 * | 12/2013 | Eisermann | B32B 27/04 428/142 |
| 2002/0068148 A1 * | 6/2002 | Nakamura | B44C 1/222 428/131 |
| 2002/0189526 A1 * | 12/2002 | Sugimoto | B60K 37/02 116/286 |
| 2004/0032797 A1 * | 2/2004 | Sato | G04B 19/10 368/232 |
| 2004/0081807 A1 * | 4/2004 | Bonkowski | G03H 1/02 428/195.1 |
| 2005/0175826 A1 * | 8/2005 | Suzuki | C25D 1/04 428/209 |
| 2006/0092521 A1 * | 5/2006 | Birman | B60K 35/00 359/630 |
| 2006/0185576 A1 * | 8/2006 | Tane | G01D 11/28 116/288 |
| 2006/0286352 A1 * | 12/2006 | Suzuki | G01D 11/28 428/172 |
| 2007/0082180 A1 * | 4/2007 | King | B05D 3/12 428/174 |
| 2008/0014410 A1 * | 1/2008 | Johnston | B29C 33/62 428/141 |
| 2008/0159083 A1 * | 7/2008 | Kawakami | G04B 19/12 368/232 |
| 2008/0213546 A1 * | 9/2008 | Murata | B05D 5/02 428/195.1 |
| 2009/0061159 A1 * | 3/2009 | Staub | G03H 1/26 428/161 |
| 2009/0104409 A1 * | 4/2009 | Derriey | C03C 17/04 428/172 |
| 2009/0129210 A1 * | 5/2009 | Yamaguchi | G04C 10/02 368/205 |
| 2010/0046103 A1 * | 2/2010 | Yeh | G02B 5/201 359/831 |
| 2010/0086740 A1 * | 4/2010 | Lee | B29C 45/372 428/156 |
| 2010/0258971 A1 * | 10/2010 | Sun | B29C 45/372 264/219 |
| 2010/0304065 A1 * | 12/2010 | Tomantschger | B32B 15/08 428/35.8 |
| 2011/0128470 A1 * | 6/2011 | Yorita | B60K 35/00 349/62 |
| 2011/0274881 A1 * | 11/2011 | Konda | B05D 5/00 428/161 |
| 2012/0140604 A1 * | 6/2012 | Kawakami | G04B 19/10 368/276 |
| 2012/0141818 A1 * | 6/2012 | Kajiwara | H01L 21/56 428/610 |
| 2012/0155225 A1 * | 6/2012 | Takasawa | G04B 19/12 368/223 |
| 2012/0188770 A1 * | 7/2012 | Kunitachi | B60K 37/02 362/293 |
| 2012/0236415 A1 * | 9/2012 | Nagano | G02B 5/1842 359/567 |
| 2012/0328905 A1 * | 12/2012 | Guo | B23K 26/0084 428/687 |
| 2013/0040090 A1 * | 2/2013 | Sakurai | B60K 35/00 428/66.6 |
| 2013/0258821 A1 * | 10/2013 | Ohiso | G04C 10/02 368/205 |
| 2014/0016244 A1 * | 1/2014 | Monno | C08J 5/18 361/323 |
| 2014/0036472 A1 * | 2/2014 | Ishihara | F21V 33/00 362/23.14 |
| 2014/0240954 A1 * | 8/2014 | Gullick | G02B 6/0005 362/23.21 |
| 2014/0272294 A1 * | 9/2014 | Moore | B44C 5/04 428/141 |
| 2015/0050514 A1 * | 2/2015 | Storm | C23C 4/06 428/600 |
| 2015/0136226 A1 * | 5/2015 | Guo | H01L 31/02327 136/256 |
| 2015/0158074 A1 * | 6/2015 | Kim | B21H 8/005 428/573 |
| 2015/0219913 A1 * | 8/2015 | Lee | B60K 35/00 359/462 |
| 2016/0052392 A1 * | 2/2016 | Terashima | B60K 35/00 359/601 |
| 2016/0070099 A1 * | 3/2016 | Inomata | G02B 5/02 359/631 |
| 2016/0091346 A1 * | 3/2016 | Otani | G01D 11/28 362/23.16 |
| 2016/0221440 A1 * | 8/2016 | Tane | B60K 35/00 |
| 2016/0229337 A1 * | 8/2016 | Birman | G02B 6/001 |
| 2016/0252373 A1 * | 9/2016 | Fujita | G01D 13/04 116/334 |
| 2017/0060093 A1 * | 3/2017 | Awano | G04B 19/12 |
| 2017/0106751 A1 * | 4/2017 | Wachinger | B60K 35/00 |
| 2017/0106813 A1 * | 4/2017 | Hattori | B60K 35/00 |
| 2017/0129337 A1 * | 5/2017 | Sano | B29C 33/42 |
| 2017/0242184 A1 * | 8/2017 | Maraldo | G02B 6/0076 |
| 2017/0297507 A1 * | 10/2017 | Dellock | G09F 3/02 |
| 2017/0307422 A1 * | 10/2017 | Horvath | G01D 13/04 |
| 2017/0341600 A1 * | 11/2017 | Kannzaki | B29C 33/424 |
| 2017/0355321 A1 * | 12/2017 | Dellock | B60R 13/00 |

FOREIGN PATENT DOCUMENTS

| JP | 2007-232403 A |   | 9/2007 |  |
| JP | 2014194371 A | * | 10/2014 |  |
| JP | 2015-87379 A |   | 5/2015 |  |
| JP | 2015099084 A | * | 5/2015 | ............ G01D 13/02 |
| JP | 2015-100933 A |   | 6/2015 |  |
| WO | 2015/076327 A1 |   | 5/2015 |  |
| WO | 2015/088017 A1 |   | 6/2015 |  |
| WO | 2015/088022 A1 |   | 6/2015 |  |

OTHER PUBLICATIONS

Tassin et al., Biaxial Stretching of PET Films: a Molecular Description, Macromolecular Symposia, 1999.*
Notification of Reasons for Refusal dated Jan. 8, 2016 to Japanese patent application No. 2015-205788 with English translation.
Decision to Grant a Patent dated Mar. 17, 2016 to Japanese patent application No. 2015-205788 with English translation.
English Translation only of the allowed claims in corresponding JP Application No. 2015-205788.
German Office Action for the related German Patent Application No. 10 2016 220 331.2 dated May 12, 2017.

* cited by examiner

FIG.9

| | FIRST COMPARATIVE EXAMPLE | SECOND COMPARATIVE EXAMPLE | THIRD COMPARATIVE EXAMPLE | FIRST EXAMPLE | SECOND EXAMPLE | REAL METAL |
|---|---|---|---|---|---|---|
| WIDTH W [μm] | 43.84 TO 199.3 | 0 TO 82.34 | 2.853 TO 75.93 | 0.331 TO 2.653 | 0.280 TO 1.439 | 0.337 TO 1.562 |
| HEIGHT H [μm] | 10.17 TO 18.07 | 0 TO 1.053 | 0.225 TO 1.195 | 0.007 TO 0.316 | 0.006 TO 0.310 | 0.007 TO 0.611 |
| EVALUATION VALUE | 80 | 85 | 90 | 110 | 120 | — |

METALLIC DECORATIVE PART FOR VEHICLE DISPLAY DEVICE, AND VEHICLE DISPLAY DEVICE

CROSS-REFERENCE TO RELATED APPLICATION(S)

The present application claims priority to and incorporates by reference the entire contents of Japanese Patent Application No. 2015-205788 filed in Japan on Oct. 19, 2015.

BACKGROUND OF THE INVENTION

1. Field of the Invention

The present invention relates to a metallic decorative part for a vehicle display device, and to a vehicle display device.

2. Description of the Related Art

Japanese Patent Application Laid-open No. 2007-232403, for example, discloses a decorative member for a vehicle instrument as a known metallic decorative part for a vehicle display device to be applied to a vehicle display device. The metallic decorative part includes a substrate, a primer layer, and a metal coating. The substrate is formed of a light-transmissive material and a display design is formed thereon. The primer layer and the metal coating are stacked in sequence on portions of the substrate excluding a front surface of the substrate and a front surface of the display design.

The decorative member disclosed in Japanese Patent Application Laid-open No. 2007-232403 needs further improvement to exhibit more appropriate metallic texture.

SUMMARY OF THE INVENTION

The present invention has been made in view of the foregoing situation and it is an object of the present invention to provide a metallic decorative part for a vehicle display device, and a vehicle display device, that can achieve appropriate metallic texture to be given to a viewer in a configuration including a metal thin film on a surface of a substrate body formed of resin.

In order to achieve the above mentioned object, a metallic decorative part for a vehicle display device according to one aspect of the present invention includes a substrate body molded from a synthetic resin; a metal thin film that is formed of metal and deposited on a surface of the substrate body; and a plurality of grooves that is formed on a surface of the metal thin film in accordance with a shape of the surface of the substrate body, wherein the grooves are formed so that a width between bottom points of the grooves adjacent to each other is larger than 0 and equal to or smaller than 3.0 μm, and a height of an apex between the adjacent grooves from lower one of the bottom points of the adjacent grooves is larger than 0 and equal to or smaller than 1.0 μm, and the grooves are formed so that a distribution width of the width is equal to or larger than 1.2 μm, and a distribution width of the height is equal to or larger than 0.3 μm.

In order to achieve the above mentioned object, a metallic decorative part for a vehicle display device according to another aspect of the present invention includes a substrate body molded from a synthetic resin; a metal thin film that is formed of metal and deposited on a surface of the substrate body; and a plurality of grooves that is formed on a surface of the metal thin film in accordance with a shape of the surface of the substrate body, wherein the grooves are formed so that a width between bottom points of the grooves adjacent to each other is larger than 0 and equal to or smaller than 3.0 μm, and a height of an apex between the adjacent grooves from lower one of the bottom points of the adjacent grooves is larger than 0 and equal to or smaller than 1.0 μm, and the grooves include a first curved groove that is formed in an arc shape or a circular shape and extends so that a sum of central angles is equal to or larger than 360°, and a second curved groove that is formed in an arc shape and extends so that a sum of central angles is smaller than 360°.

According to still another aspect of the present invention, in the metallic decorative part for a vehicle display device, it is possible to configure that the grooves are formed so that the width is larger than 0 and equal to or smaller than 2.7 μm, and the height is larger than 0 and equal to or smaller than 0.35 μm.

According to still another aspect of the present invention, in the metallic decorative part for a vehicle display device, it is possible to configure that the grooves include a first linear groove formed to linearly extend and pass through a predetermined formation region, and a second linear groove formed to linearly extend in which at least one end of the second linear groove is blocked in the formation region.

In order to achieve the above mentioned object, a vehicle display device according to still another aspect of the present invention includes a display unit that displays information relating to a vehicle; and the metallic decorative part for a vehicle display device that includes a substrate body molded from a synthetic resin, a metal thin film that is formed of metal and deposited on a surface of the substrate body, and a plurality of grooves that is formed on a surface of the metal thin film in accordance with a shape of the surface of the substrate body, wherein the grooves are formed so that a width between bottom points of the grooves adjacent to each other is larger than 0 and equal to or smaller than 3.0 μm, and a height of an apex between the adjacent grooves from lower one of the bottom points of the adjacent grooves is larger than 0 and equal to or smaller than 1.0 μm, and the grooves are formed so that a distribution width of the width is equal to or larger than 1.2 μm, and a distribution width of the height is equal to or larger than 0.3 μm.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating a result of a sensory evaluation test of the dial plate according to an example.

DETAILED DESCRIPTION OF THE PREFERRED EMBODIMENTS

The following describes in detail a preferred embodiment according to the present invention. The embodiment is, however, presented by way of example only and is not intended to limit the scope of the invention. Additionally, components of the embodiment include those that can be replaced by those skilled in the art and simple or substantially identical ones.

Embodiment

Figure 1:
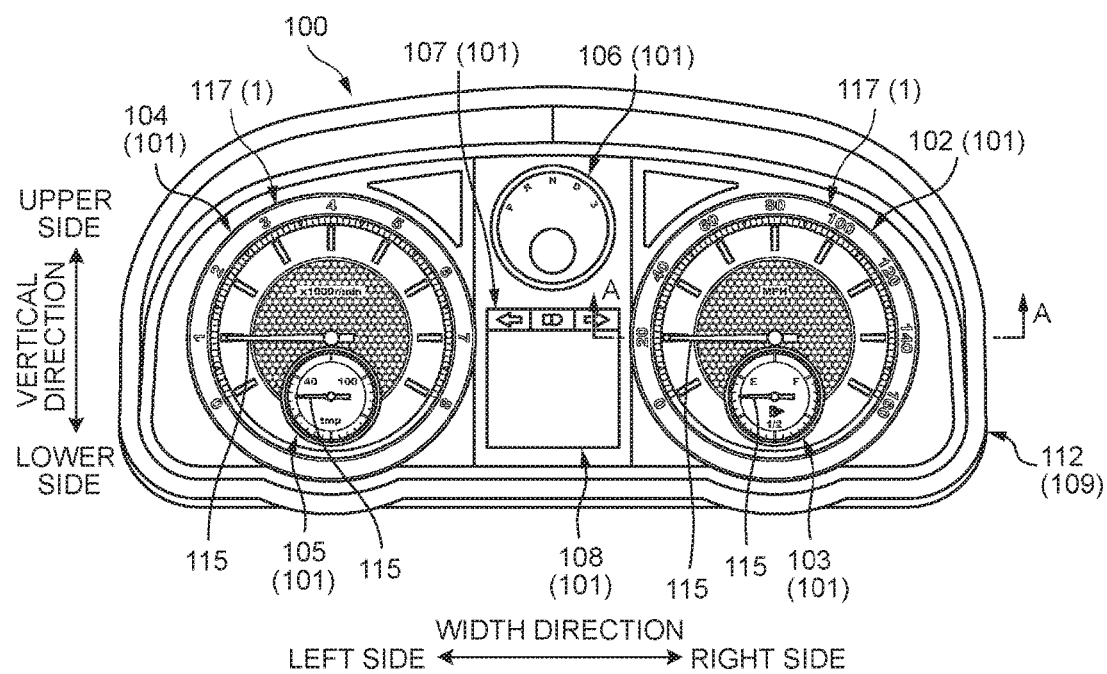
FIG. 1 is a front view illustrating a schematic configuration of a vehicle display device according to an embodiment.
Figure 2:
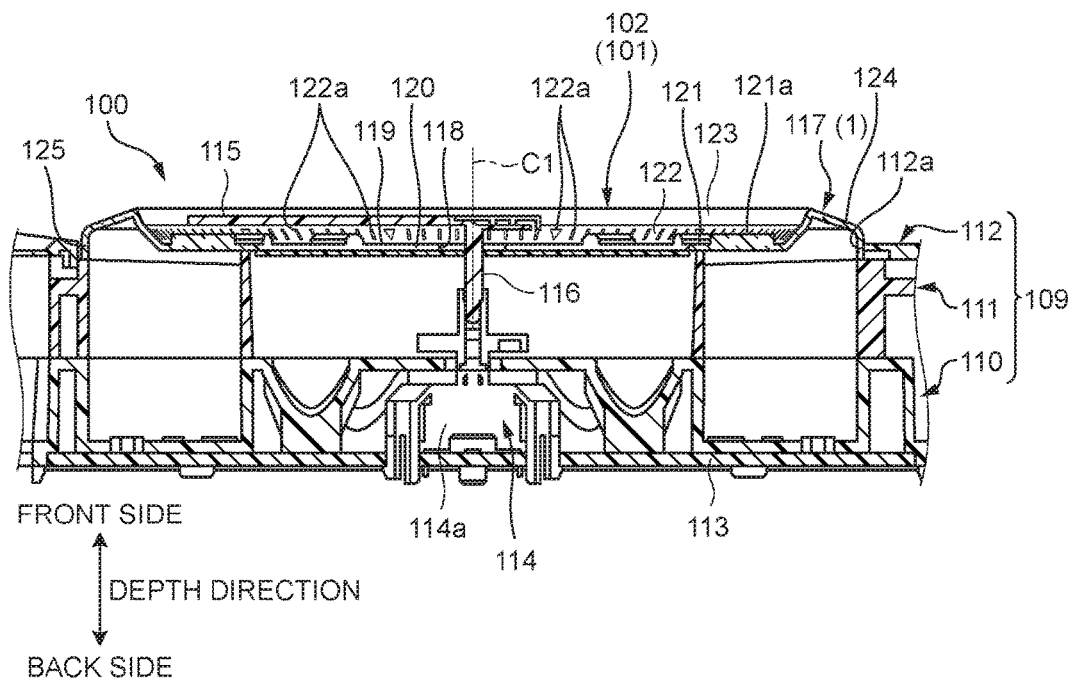
FIG. 2 is an A-A partial cross-sectional view of FIG. 1.
Figure 3:
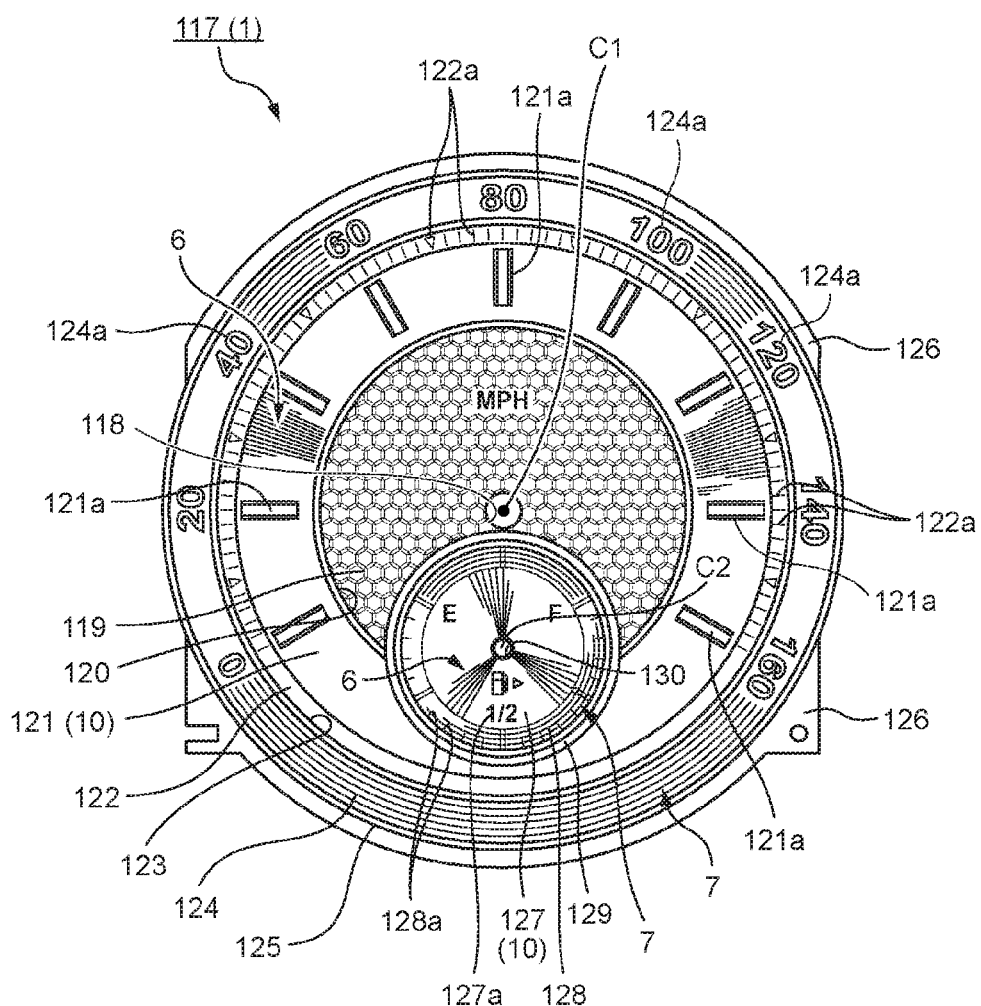
FIG. 3 is a front view illustrating a schematic configuration of a dial plate applied to the vehicle display device according to the embodiment.
Figure 4:
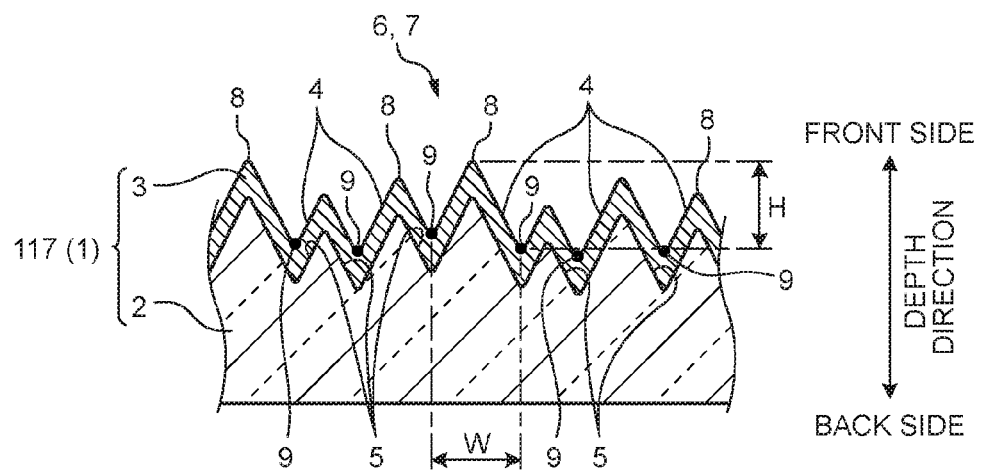
FIG. 4 is a schematic cross-sectional view illustrating a schematic configuration of the dial plate applied to the vehicle display device according to the embodiment.
Figure 5:
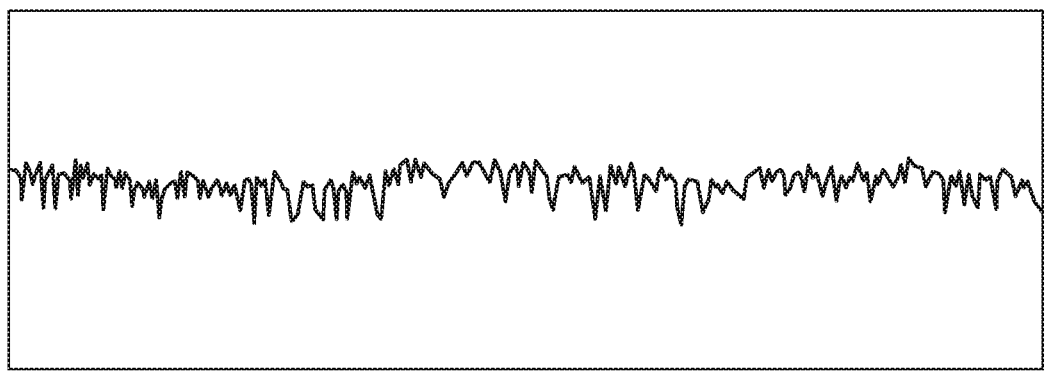
FIG. 5 is a diagram illustrating an example of measurement data related to the dial plate applied to the vehicle display device according to the embodiment.
Figure 6:
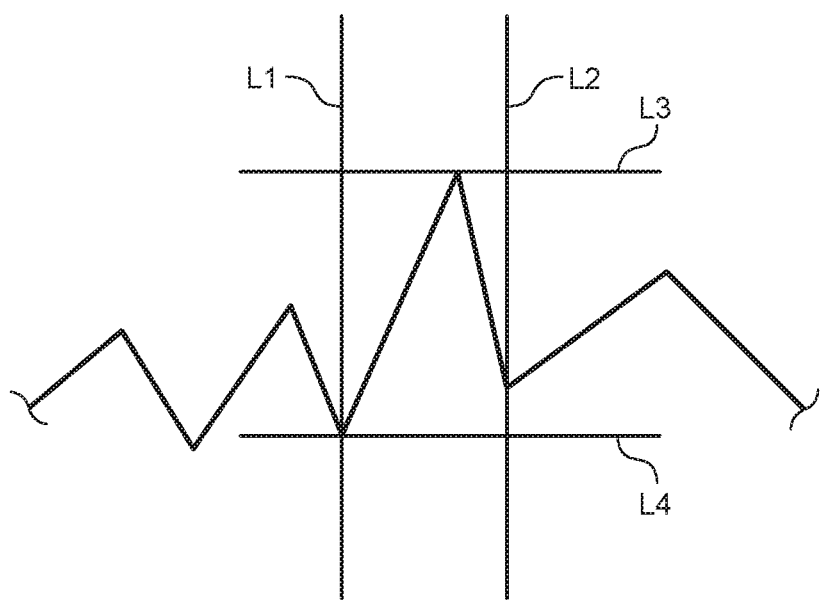
FIG. 6 is a diagram illustrating an example of the measurement data related to the dial plate applied to the vehicle display device according to the embodiment.
Figure 7:
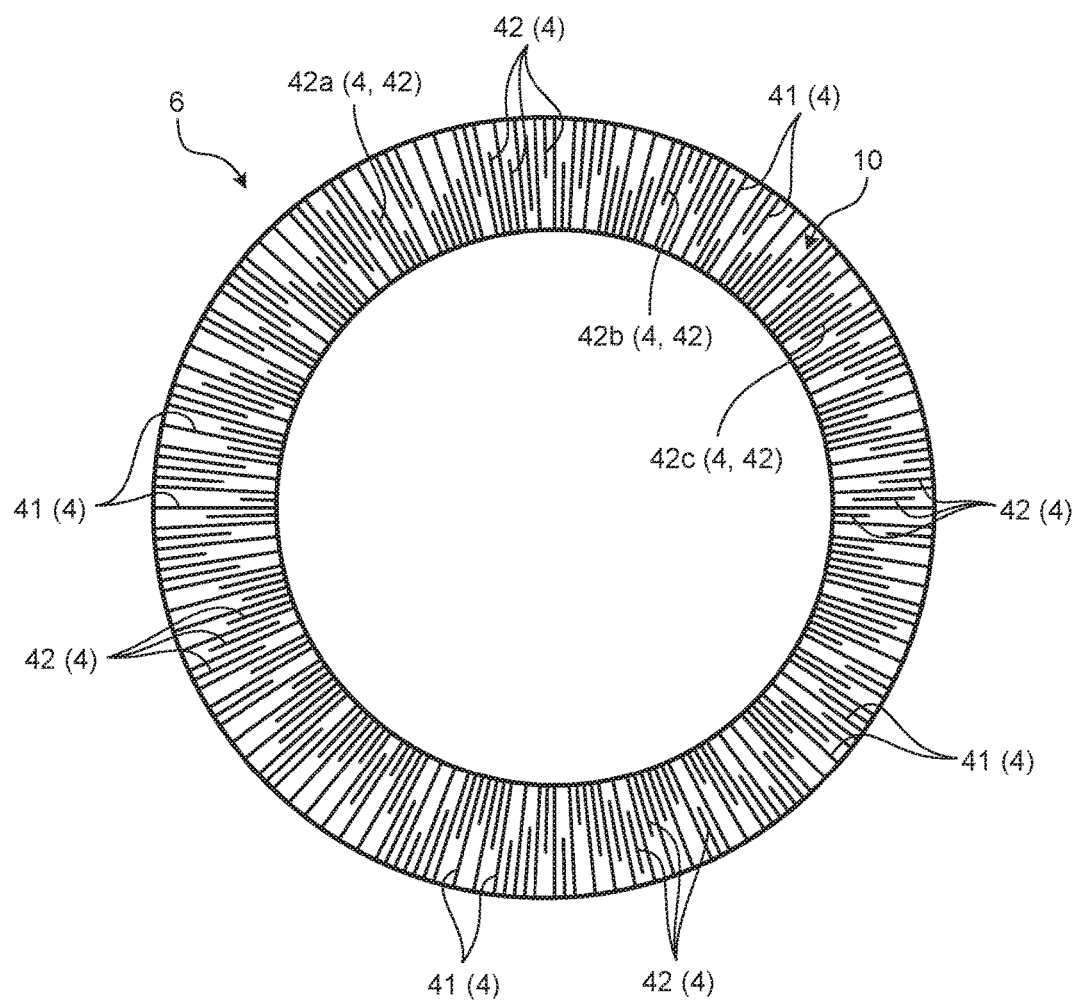
FIG. 7 is a schematic diagram for explaining grooves configuring a radial mark pattern of the dial plate applied to the vehicle display device according to the embodiment.
Figure 8:
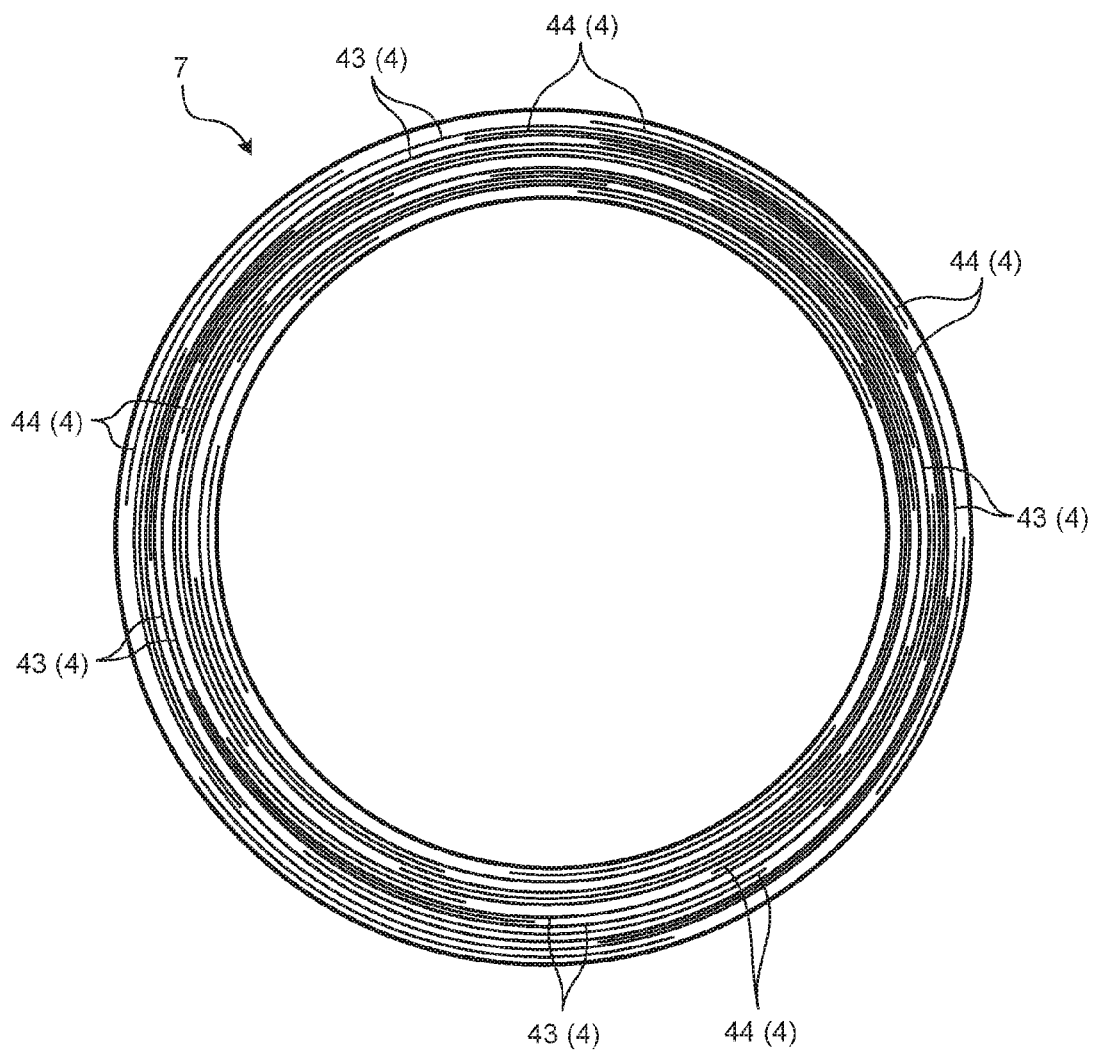
FIG. 8 is a schematic diagram for explaining grooves configuring a spin mark pattern of the dial plate applied to the vehicle display device according to the embodiment.

FIG. 1 is a front view illustrating a schematic configuration of a vehicle display device according to an embodiment. FIG. 2 is an A-A partial cross-sectional view of FIG. 1. FIG. 3 is a front view illustrating a schematic configuration of a dial plate applied to the vehicle display device according to the embodiment. FIG. 4 is a schematic cross-sectional view illustrating a schematic configuration of the dial plate applied to the vehicle display device according to the embodiment. FIGS. 5 and 6 are diagrams illustrating an example of measurement data related to the dial plate applied to the vehicle display device according to the embodiment. FIG. 7 is a schematic diagram for explaining grooves configuring a radial mark pattern of the dial plate applied to the vehicle display device according to the embodiment. FIG. 8 is a schematic diagram for explaining grooves configuring a spin mark pattern of the dial plate applied to the vehicle display device according to the embodiment.

As illustrated in FIGS. 1 and 2, decorative parts 1 as metallic decorative parts for a vehicle display device according to the embodiment are applied to a vehicle display device 100 that is mounted on a vehicle. The vehicle display device 100 constitutes what is called an in-vehicle meter. The vehicle display device 100 is mounted, for example, in an instrument panel disposed on a dashboard of the vehicle. The vehicle display device 100 displays various types of information relating to the vehicle, serving for operation of the vehicle. The vehicle display device 100 includes display units 101 and the decorative parts 1. The display units 101 display information relating to the vehicle. The decorative parts 1 are incorporated into different parts of the vehicle display device 100 including the display units 101. The vehicle display device 100 is configured such that the decorative parts 1 each include a metal thin film 3 affixed to a surface of a substrate body 2 formed of resin. The metal thin film 3 is formed into a predetermined shape to thereby give a viewer appropriate metallic texture.

It is noted that the vehicle display device 100 illustrated in FIG. 1 has a width direction that corresponds to the width direction of the vehicle to which the vehicle display device 100 is applied. In the following, the left-hand side facing the front surface of the vehicle display device 100 (left side in FIG. 1) may be referred to, in the width direction of the vehicle display device 100, as the left side in the width direction and the right-hand side facing the front surface of the vehicle display device 100 (right side in FIG. 1) may be referred to, in the width direction of the vehicle display device 100, as the right side in the width direction. In addition, the vehicle display device 100 illustrated in FIG. 2 has a depth direction that typically corresponds to the anterior-posterior direction of the vehicle to which the vehicle display device 100 is applied. Additionally, the vehicle display device 100 has a front surface side that faces a driver's seat of the vehicle and that typically corresponds to a side viewed by a driver sitting in the driver's seat. The vehicle display device 100 has a back surface side that is opposite in the depth direction to the front surface side and that is typically a side accommodated inside the instrument panel.

The display units 101 display various types of information relating to the vehicle. The display units 101 include, exemplarily as the information relating to the vehicle, a speedometer 102, a fuel indicator 103, a tachometer 104, a coolant temperature indicator 105, a shift indicator 106, a turn indicator 107, and a multi-display 108. Specifically, the speedometer 102 indicates a vehicle speed. The fuel indicator 103 indicates a level of fuel still available for use. The tachometer 104 indicates output speed of a traveling drive power source. The coolant temperature indicator 105 indicates the temperature of coolant. The shift indicator 106 indicates a shift position. The turn indicator 107 indicates an operating condition of a turn signal indicator (winker). The multi-display 108 displays other types of auxiliary driving information. The display units 101 are disposed inside a housing 109 that houses different parts of the vehicle display device 100. The display units 101 have display surfaces of various types of information exposed on the front surface side in the depth direction. The housing 109 is formed, for example, of a resin material. The housing 109 includes, for example, a back surface case 110, an intermediate case 111, and a facing 112. The back surface case 110 is disposed on the back surface side in the depth direction. The intermediate case 111 is disposed on the front surface side in the depth direction of the back surface case 110. The facing 112 is disposed on the front surface side in the depth direction of the intermediate case 111. The display units 101 are disposed inside the space defined by the back surface case 110, the intermediate case 111, and the facing 112. In the housing 109, each of the display units 101 has a display surface exposed on the front surface side in the depth direction via an opening 112a (refer to FIG. 2) formed in the facing 112. The display units 101 are configured such that the fuel indicator 103 has a display surface incorporated in a display surface of the speedometer 102 and the coolant temperature indicator 105 has a display surface incorporated in a display surface of the tachometer 104. The display units 101 are configured such that, in the housing 109, the speedometer 102 and the fuel indicator 103 are disposed on the right side in the width direction, the tachometer 104 and the coolant temperature indicator 105 are disposed on the left side in the width direction, and the shift indicator 106, the turn indicator 107, and the multi-display 108 are disposed in the middle therebetween.

As illustrated in FIG. 2, the speedometer 102, for example, includes an internal mechanism 114 that is fixed to a wiring board 113 disposed inside the housing 109. The internal mechanism 114 includes a motor 114a that serves as a drive source for a needle pointer 115. The needle pointer 115 includes a rotational shaft 116 provided in a protruding manner from the motor 114a. The fuel indicator 103, the tachometer 104, and the coolant temperature indicator 105 are configured substantially similarly to the speedometer 102. The facing 112 covers the wiring board 113 and the internal mechanism 114, for example. The facing 112 allows each of the display units 101 (the speedometer 102, the fuel indicator 103, the tachometer 104, the coolant temperature indicator 105, the shift indicator 106, the turn indicator 107, the multi-display 108, and the like) to have display surfaces exposed on the front surface side in the depth direction via the opening 112a as described above. It is noted that the vehicle display device 100 has the front surface side in the depth direction of the respective display units 101 protected by a transparent cover fitted to the housing 109.

The decorative parts 1 serve as ornamental members for portions that are, in the vehicle display device 100, exposed on the front surface side in the depth direction and visible from occupants including the driver. The decorative parts 1 are applied to dial plates 117 incorporated in, for example, the respective display units 101, such as the speedometer 102, the fuel indicator 103, the tachometer 104, and the coolant temperature indicator 105. The dial plates 117 constitute display surfaces exposed on the front surface side in the depth direction from the opening 112a in, for example, the speedometer 102, the fuel indicator 103, the tachometer 104, and the coolant temperature indicator 105. The dial plate 117 includes decoration of a scale pointed by the needle pointer 115, and decoration of various patterns, symbols, character strings, and the like relating to measured values assigned to the corresponding scale.

The following illustrates the dial plates 117 incorporated in the speedometer 102 and in the fuel indicator 103 incorporated in the display surface of the speedometer 102, with reference to, for example, FIGS. 2, 3, and 4. It is noted that the dial plates 117 incorporated in the tachometer 104 and in the coolant temperature indicator 105 incorporated in the display surface of the tachometer 104 are similarly configured.

The dial plate 117 configured as the decorative part 1 has a surface of the front surface side in the depth direction constituting a display surface. The dial plate 117 is generally formed into a substantially circular shape. The dial plate 117 has a shaft hole 118 formed in an area that includes a central axis line C1 of the substantially circular shape, and receives the rotational shaft 116 of the needle pointer 115 of the speedometer 102 passed therethrough. The shaft hole 118 passes through the dial plate 117 in the depth direction. The shaft hole 118 is formed into a substantially circular shape about the central axis line C1. The dial plate 117 includes a center disc section 119, a boundary rising surface 120, a speedometer main scale section 121, a speedometer auxiliary scale section 122, a frame wall 123, a speedometer character display section 124, and a cylindrical end section 125 that are formed concentrically about the central axis line C1 in sequence outwardly in a radial direction from the shaft hole 118 side into substantially annular rings. The dial plate 117 functions such that the speedometer main scale section 121, the speedometer auxiliary scale section 122, the speedometer character display section 124, and the like constitute a portion corresponding to the display surface of the speedometer 102.

The center disc section 119 is formed into a substantially annular ring on the outside in the radial direction of the shaft hole 118. The center disc section 119 is formed in a honeycomb mesh. A character string is disposed on the center disc section 119 to denote, for example, a unit of a physical quantity indicated by the speedometer 102, in this case "MPH", for example. The boundary rising surface 120 is connected with the outside in the radial direction of the center disc section 119 and formed into a substantially annular ring. The boundary rising surface 120 is formed as a substantially cylindrical riser surface that protrudes from the center disc section 119 to the front surface side in the depth direction along the central axis line C1. The speedometer main scale section 121 is connected with the outside in the radial direction of an end portion on the front surface side in the depth direction of the boundary rising surface 120 and formed into a substantially annular ring. The speedometer main scale section 121 is associated with the physical quantity indicated by the speedometer 102, specifically, the vehicle speed. The speedometer main scale section 121 includes a plurality of main scales 121a pointed by the needle pointer 115. The main scales 121a are formed in a protruding manner at equally spaced intervals along the circumferential direction of the speedometer main scale section 121. The speedometer auxiliary scale section 122 is connected with the outside in the radial direction of the speedometer main scale section 121 and formed into a substantially annular ring. The speedometer auxiliary scale section 122 is slightly inclined with respect to the speedometer main scale section 121. The speedometer auxiliary scale section 122 is associated with the physical quantity indicated by the speedometer 102, specifically, the vehicle speed. The speedometer auxiliary scale section 122 includes a plurality of auxiliary scales 122a pointed by the needle pointer 115. The auxiliary scales 122a are formed in a protruding manner at equally spaced intervals along the circumferential direction of the speedometer auxiliary scale section 122, at intervals shorter than the intervals at which the main scales 121a are formed. The frame wall 123 is connected with the outside in the radial direction of the speedometer auxiliary scale section 122 and formed into a substantially annular ring. The frame wall 123 is slightly inclined with respect to the speedometer auxiliary scale section 122. More specifically, the frame wall 123 is inclined with respect to the speedometer main scale section 121 more sharply than the speedometer auxiliary scale section 122 is. The speedometer character display section 124 is connected with the outside in the radial direction of the frame wall 123 and formed into a substantially annular ring. The speedometer character display section 124 is inclined reversely with respect to the frame wall 123. The speedometer character display section 124 includes a plurality of character strings 124a representing measured values, specifically, the vehicle speed. The character strings 124a include "20", "40", and "60" that are formed in a protruding manner at equally spaced intervals along the circumferential direction of the speedometer character display section 124. The cylindrical end section 125 is connected with the outside in the radial direction of the speedometer character display section 124 and formed into a substantially annular ring. The cylindrical end section 125 is formed into a substantially cylindrical riser surface that folds back from the speedometer character display section 124 toward the back surface side in the depth direction along the central axis line C1. It is noted that the dial plate 117 includes, for example, a mounting section 126 formed on an outer side in the radial direction of the cylindrical end section 125. The mounting section 126 is used for mounting the corresponding dial plate 117 on, for example, the housing 109.

In addition, a fuel indicator disc section 127, a fuel indicator scale section 128, and a boundary annular section 129 are formed in the dial plate 117 so as to be incorporated into portions of the center disc section 119, the boundary rising surface 120, and the speedometer main scale section 121. The dial plate 117 has a shaft hole 130 formed in an area that includes a reference line C2 that extends in parallel with the central axis line C1 and that is set at a position offset (in FIG. 3, the position offset downwardly) from the central axis line C1. The shaft hole 130 receives the rotational shaft of the needle pointer 115 of the fuel indicator 103 passed therethrough. The shaft hole 130 passes through the dial plate 117 in the depth direction. The shaft hole 130 is formed into a substantially circular shape about the reference line C2. The dial plate 117 includes the fuel indicator disc section 127, the fuel indicator scale section 128, and the boundary annular section 129 that are formed concentrically about the reference line C2 in sequence outwardly in the radial direction from the shaft hole 130 side into substantially annular rings. The dial plate 117 functions such that the fuel indicator disc section 127, the fuel indicator scale section 128, and the like constitute a portion corresponding to the display surface of the fuel indicator 103.

The fuel indicator disc section 127 is formed into a substantially annular ring on the outside in the radial direction of the shaft hole 130. The fuel indicator disc section 127 includes character strings 127a representing a physical quantity indicated by the fuel indicator 103, specifically, the character strings 127a such as "½", "E" (the first letter of Empty), and "F" (the first letter of Full), and various patterns. The fuel indicator scale section 128 is connected with the outside in the radial direction of the fuel indicator disc section 127 and formed into a substantially annular ring. The fuel indicator scale section 128 is associated with the physical quantity indicated by the fuel indicator 103, specifically, the level of fuel still available for use. The fuel indicator scale section 128 includes a plurality of scales 128a indicated by the needle pointer 115. The scales 128a are formed at equally spaced intervals along the circumferential direction of the fuel indicator scale section 128. The boundary annular section 129 is connected with the outside in the radial direction of the fuel indicator scale section 128 and formed into a substantially annular ring. The boundary annular section 129 is disposed between two different areas, one area including the center disc section 119, the boundary rising surface 120, and the speedometer main scale section 121, and the other area including the fuel indicator disc section 127 and the fuel indicator scale section 128. The boundary annular section 129 functions as a boundary between an area that functions as the display surface of the speedometer 102 and an area that functions as the display surface of the fuel indicator 103.

The dial plates 117 configured as the decorative parts 1 in the present embodiment each include the substrate body 2, the metal thin film 3, and a plurality of grooves 4. Specifically, the substrate body 2 is molded from synthetic resin. The metal thin film 3 is formed of metal and deposited on a surface of the substrate body 2 so as to provide an outer covering. The grooves 4 are formed in a surface of the metal thin film 3 in accordance with the shape of the surface of the substrate body 2. The dial plate 117 has a layered structure including the metal thin film 3 stacked on the surface of the substrate body 2. The surface of the metal thin film 3 constitutes the display surface of the dial plate 117. The grooves 4 formed in the display surface give a predetermined area a patterned decoration.

It should here be noted that the surface of each of the substrate body 2 and the metal thin film 3 is a surface on the front surface side in the depth direction, specifically, the surface opposed to the driver's seat of the vehicle. Typically, the surface of the metal thin film 3 is visually recognized by, for example, the driver sitting in the driver's seat.

Integral molding of synthetic resin using a mold die integrally molds the following elements described above of the substrate body 2: specifically, the center disc section 119, the boundary rising surface 120, the speedometer main scale section 121, the speedometer auxiliary scale section 122, the frame wall 123, the speedometer character display section 124, the cylindrical end section 125, the mounting section 126, the fuel indicator disc section 127, the fuel indicator scale section 128, the boundary annular section 129, the main scales 121a, the auxiliary scales 122a, the character strings 124a, the character strings 127a, and the scales 128a. The metal thin film 3 is deposited on the surface of the substrate body 2 so as to provide an outer covering. The grooves 4 are formed in the surface of the metal thin film 3 in accordance with the shape of the surface of the substrate body 2. In other words, the substrate body 2 has grooves 5 formed in the surface covered by the metal thin film 3 in accordance with the shape of the grooves 4 formed in the surface on which the metal thin film 3 is deposited. During integral molding of the substrate body 2 from the synthetic resin using the mold die, grooves formed in a molded surface of the mold die are transferred onto the surface of the substrate body 2 to form the grooves 5.

The grooves 4 in the present embodiment form various mark patterns on the surface of the dial plate 117. Exemplarily, the dial plates 117 in the present embodiment are marked with what is called a radial mark pattern 6 and what is called a spin mark pattern 7. The radial mark pattern 6 is applied by the grooves 4 to the surfaces of the speedometer main scale section 121 and the fuel indicator disc section 127. The spin mark pattern 7 is applied by the grooves 4 to the surfaces of the speedometer character display section 124 and the fuel indicator scale section 128. The radial mark pattern 6 is formed by the fine grooves 4 extending radially from a preset reference point (e.g., a point on the central axis line C1 or the reference line C2) or a point nearby the preset reference point outwardly. The radial mark pattern 6 may at times be referred to as a rising-sun pattern. The spin mark pattern 7 is formed by the fine grooves 4 extending in a concentric annular ring shape or a spiral ring shape about a preset reference point (e.g., a point on the central axis line C1 or the reference line C2).

The grooves 4 configuring the radial mark pattern 6 or the spin mark pattern 7 according to the present embodiment are formed such that a width W illustrated in FIG. 4 is larger than 0 and equal to or smaller than 3.0 μm, and a height H illustrated in FIG. 4 is larger than 0 and equal to or smaller than 1.0 μm. That is, the grooves 4 are formed to satisfy a conditional expression represented as the expression (1) below assuming that the width illustrated in FIG. 4 is "W", and the height illustrated in FIG. 4 is "H".

$$0 < W \leq 3.0 \text{ μm, and } 0 < H \leq 1.0 \text{ μm} \quad (1)$$

More preferably, the grooves 4 are formed such that the width W is larger than 0 and equal to or smaller than 2.7 μm, and the height H is larger than 0 and equal to or smaller than 0.35 μm. That is, more preferably, the grooves 4 are formed to satisfy a conditional expression represented as the expression (2) below.

$$0 < W \leq 2.7 \text{ μm, and } 0 < H \leq 0.35 \text{ μm} \quad (2)$$

Typically, a lower limit value of the width W and the height H may be within a range that is acceptable in manufacturing and can be visually recognized. The lower limit value of the width W may be, for example, about 0.1 μm (0.1 μm ≤ W).

More specifically, as illustrated in FIG. 4, the width W corresponds to a width between bottom points (bottoms) 9 of adjacent grooves 4 positioned across an apex (peak) 8 between the adjacent grooves 4. On the other hand, as illustrated in FIG. 4, the height H corresponds to a height of the apex 8 between the adjacent grooves 4 from a lower one of the bottom points 9 of the adjacent grooves 4. The dial plate 117 configured as the decorative part 1 is formed in a shape in which all widths W and heights H measured under a predetermined measurement condition set in advance satisfy any of the conditional expressions represented as the expressions (1) and (2) on the surface on which the grooves 4 are formed.

As the predetermined measurement condition set in advance for measuring the width W and the height H, the following condition can be exemplified. That is, measurement is performed according to the following procedure using a "3D measurement laser microscope LEXT OLS4000 manufactured by Olympus Corporation" as measurement equipment used for measuring the width W and the height H.

Step 1 Photograph an image of the surface of the dial plate 117 configured as the decorative part 1 with the "3D measurement laser microscope LEXT OLS4000 manufactured by Olympus Corporation" in a "photographing" mode.

Step 2 After the image is photographed, select a "measurement" tab on an operation screen of the "3D measurement laser microscope LEXT OLS4000 manufactured by Olympus Corporation" (hereinafter, simply referred to as an "operation screen" in some cases), switch the mode into "measurement", and select "profile measurement". As a result, profile data (outline data) of the surface of the dial plate 117 exemplified in FIG. 5 is displayed on the operation screen. In FIG. 5, a horizontal axis indicates a position in an optional direction on the photographed surface of the dial plate 117, and a vertical axis indicates a height of the surface at the surface position.

Step 3 Next, on the operation screen, enlarge a predetermined portion (measured portion of the width W and the height H) of the profile data of the surface of the dial plate 117 displayed in Step 2. FIG. 6 is an example of the enlarged profile data.

Step 4 Next, on the operation screen, align a vertical axis measurement line L1 on the left with one of adjacent bottom points (bottoms) on the left (corresponding to one of the bottom points 9 of the adjacent grooves 4), and align a vertical axis measurement line L2 on the right with one of the adjacent bottom points (bottoms) on the right (corresponding to one of the bottom points 9 of the adjacent grooves 4) on the profile data of the surface of the dial plate 117 enlarged in Step 3. Additionally, on the operation screen, align a horizontal axis measurement line L3 on an upper side with the apex (corresponding to the apex 8 between the adjacent grooves 4)) between the adjacent bottom points, and align a horizontal axis measurement line L4 on a lower side with lower one of the bottom points positioned across the apex (corresponding to lower one of the bottom points 9 of the adjacent grooves 4) on the profile data of the surface of the dial plate 117 enlarged in Step 3. A distance between the vertical axis measurement line L1 and the vertical axis measurement line L2 thus obtained is a measurement value of the width W, and a distance between the horizontal axis measurement line L3 and the horizontal axis measurement line L4 is a measurement value of the height H.

When the dial plate 117 configured as the decorative part 1 is formed in a shape in which the width W and the height H satisfy any of the conditional expressions represented as the expressions (1) and (2), the width and the height (depth) close to those of a groove formed by cutting work on actual metal can be reproduced in the grooves 4 configuring the radial mark pattern 6 or the spin mark pattern 7.

Additionally, the grooves 4 configuring the radial mark pattern 6 or the spin mark pattern 7 according to the embodiment are preferably formed so that a distribution width of the width W is equal to or larger than 1.2 µm, and a distribution width of the height is equal to or larger than 0.3 µm. The distribution width of the width W corresponds to a width between the maximum value and the minimum value of the width W measured as described above from the surface of the dial plate 117 on which the grooves 4 are formed, in other words, a value obtained by subtracting the minimum value from the maximum value. Similarly, the distribution width of the height H corresponds to a width between the maximum value and the minimum value of the height H measured as described above from the surface of the dial plate 117 on which the grooves 4 are formed, in other words, a value obtained by subtracting the minimum value from the maximum value. Accordingly, the dial plate 117 configured as the decorative part 1 can create a random sense by giving fluctuation to the shape of the grooves 4.

The grooves 4 configuring the radial mark pattern 6 may include a through groove 41 as a first linear groove and a blocked groove 42 as a second linear groove as illustrated in FIG. 7. The through groove 41 is a groove formed to linearly extend and pass through a predetermined formation region 10 among the groove 4 configuring the radial mark pattern 6. In other words, the through groove 41 is a groove formed to linearly extend without a blocked end in the formation region 10. The formation region 10 is a predetermined region in which the radial mark pattern 6 is formed. The formation region 10 is illustrated as a circular region herein. On the other hand, the blocked groove 42 is a groove formed to linearly extend and at least one end thereof is blocked in the formation region 10, among the grooves 4 configuring the radial mark pattern 6. The blocked groove 42 may include a groove in which a radially outer end is blocked (blocked groove 42a), a groove in which a radially inner end is blocked (blocked groove 42b), and a groove in which the radially outer end and the radially inner end are both blocked (blocked groove 42c). The through groove 41 and the blocked groove 42 may intersect with each other. The through groove 41 and the blocked groove 42 may be, for example, applied to the radial mark pattern 6 on a speedometer main scale section 121 and a fuel indicator disc section 127. In this case, in the dial plate 117, a region partitioned on the surface of the speedometer main scale section 121 and the fuel indicator disc section 127 becomes the formation region 10 in which the radial mark pattern 6 is formed. Accordingly, the dial plate 117 configured as the decorative part 1 can give fluctuation to the grooves 4 and create a random sense by mixing the through groove 41 and the blocked groove 42 as the grooves 4 configuring the radial mark pattern 6.

As illustrated in FIG. 8, the grooves 4 configuring the spin mark pattern 7 may include a main curved groove 43 as a first curved groove and an auxiliary curved groove 44 as a second curved groove. The main curved groove 43 is a groove formed in an arc shape or a circular shape centered around a reference point (for example, a point on the central axis line C1 or the reference line C2 described above) among the grooves 4 configuring the spin mark pattern 7, the groove extending so that the sum of central angles with respect to the reference point is equal to or larger than 360°. The main curved groove 43 may include a spiral groove and the like combining a circular groove centered around the reference point and an arc in which the sum of central angles with respect to the reference point is equal to or larger than 360°. On the other hand, the auxiliary curved groove 44 is a groove formed in an arc shape centered around the reference point among the grooves 4 configuring the spin mark pattern 7, the groove extending so that the sum of central angles with respect to the reference point is smaller than 360°. The main curved groove 43 and the auxiliary curved groove 44 may intersect with each other. The main curved groove 43 and the auxiliary curved groove 44 may be applied to the spin mark pattern 7 on the speedometer character display section 124 and a fuel indicator scale section 128, for example. Accordingly, the dial plate 117 configured as the decorative part 1 can give fluctuation to the grooves 4 and create a random sense by mixing the main curved groove 43 and the auxiliary curved groove 44 as the grooves 4 configuring the spin mark pattern 7.

In order for the dial plate 117 configured as the decorative part 1 to achieve the shape that satisfies any one of the conditional expressions of expressions (1) and (2) given above, preferably, synthetic resin that exhibits high fluidity and favorable transfer performance (or, ability to follow the profile of the molding surface), specifically, a cycloolefin polymer (COP) resin, is used as the synthetic resin that forms the substrate body 2 and titanium is used as the metal that forms the metal thin film 3. Additionally, preferably, the metal thin film 3 that contains titanium is deposited through what is called sputtering on the surface of the substrate body 2 that has been molded using a mold die into a predetermined shape from synthetic resin that contains the cycloolefin polymer resin.

More specifically, the substrate body 2 is molded through integral molding from the synthetic resin that contains the cycloolefin polymer resin. In this case, the mold die for molding the substrate body 2 has a molding surface on which formed are not only portions where the different parts of the dial plates 117 described above (including the center disc section 119, the boundary rising surface 120, the speedometer main scale section 121, the speedometer auxiliary scale section 122, the frame wall 123, the speedometer character display section 124, the cylindrical end section 125, the mounting section 126, the fuel indicator disc section 127, the fuel indicator scale section 128, the boundary annular section 129, the main scales 121*a*, the auxiliary scales 122*a*, the character strings 124*a*, the character strings 127*a*, and the scales 128*a*) are formed, but also the grooves formed in accordance with the shape of the grooves 4 that constitute the radial mark pattern 6 and the spin mark pattern 7 described above. Basic shapes corresponding to the different parts of the dial plates 117 are formed in the mold die using various types of machine tools, e.g., a numerical control (NC) milling machine, on the basis of machining information including shape information of the molding surface of the mold die. In this case, for the formation of the fine grooves in the molding surface of the mold die in accordance with the grooves 5, the fine grooves in accordance with the grooves 5 are cut in the molding surface of the mold die using various types of cutting tools, e.g., an end mill and a diamond cutting tool, instead of by etching, buffing, or grinding. The grooves formed in the molding surface of the mold die are transferred onto the surface of the substrate body 2, so that the grooves 5 in accordance with the shape of the grooves 4 that constitute the radial mark pattern 6 and the spin mark pattern 7 are formed in the substrate body 2.

The metal thin film 3 is deposited on the surfaces of the substrate body 2 through the film deposition of titanium by sputtering performed on the surfaces of the substrate body 2 on which the different parts of the dial plates 117 and in which the grooves 5 in accordance with the shape of the grooves 4 that constitute the radial mark pattern 6 and the spin mark pattern 7 are formed. The sputtering, as used herein, refers to a process in which a DC high voltage is applied to an inert gas, such as argon, filled in a vacuum chamber to thereby ionize the inert gas; the ionized inert gas is made to collide with a metal ingot, specifically in this case, a titanium ingot; titanium molecules/atoms as metal particles flicked off from the ingot are deposited onto the surface of the substrate body 2 as a target; a titanium metal thin film 3 is thereby deposited on the surface of the target substrate body 2. The sputtering is a method capable of achieving relatively greater adhesion of the metal thin film 3 to the substrate body 2.

As described above, the substrate body 2 is molded using the cycloolefin polymer resin, which is synthetic resin that exhibits high fluidity and favorable transfer performance. The molding of the substrate body 2 enables any desired shape required by, for example, the different parts of the dial plates 117 and the grooves 5 in accordance with the shape of the grooves 4 that constitute the radial mark pattern 6 and the spin mark pattern 7 that are formed in the molding surface of the mold die to be faithfully transferred from the molding surface to the surface of the substrate body 2.

The metal thin film 3 is formed such that a film of titanium, which exhibits favorable adhesion to the substrate body 2 molded from the cycloolefin polymer resin and permits sputtering, is deposited on the surface of the substrate body 2 by sputtering. Thus, the metal thin film 3 can achieve sufficient adhesion to the substrate body 2 without the need to have, for example, an undercoat on the surface of the substrate body 2, thus reducing a chance of the metal thin film 3 separating from the substrate body 2. Formed to contain titanium, which is materially stable, the metal thin film 3 does not require, for example, a top coat on the surface thereof, either. As a result, the metal thin film 3 can be formed to be relatively thin (e.g., approximately 0.2 μm), so that the grooves 4 that constitute the radial mark pattern 6 and the spin mark pattern 7 can be formed in the form required by the conditional expressions (1) and (2), and the like, without the need to fill the grooves 5 formed in the surface of the substrate body 2.

The decorative part 1 (dial plate 117) described above includes the substrate body 2 molded from a synthetic resin, the metal thin film 3 being made of metal and deposited on the surface of the substrate body 2, and the grooves 4 formed on the surface of the metal thin film 3 in accordance with the shape of the surface of the substrate body 2. The grooves 4 are formed so that the width W between the bottom points 9 of the adjacent grooves 4 is larger than 0 and equal to or smaller than 3.0 μm, and the height H of the apex 8 between the adjacent grooves 4 with respect to lower one of the bottom points 9 of the adjacent grooves 4 is larger than 0 and equal to or smaller than 1.0 μm. More preferably, the grooves 4 are formed so that the width W is larger than 0 and equal to or smaller than 2.7 μm, and the height H is larger than 0 and equal to or smaller than 0.35 μm. The vehicle display device 100 described above includes the display unit 101 that displays the information relating to the vehicle, and the decorative part 1 (dial plate 117).

Thus, in the decorative part 1 (dial plate 117) and the vehicle display device 100, the grooves 4 are formed on the surface of the metal thin film 3 in accordance with the shape of the surface of the substrate body 2 formed by resin molding so that the width W and the height H satisfy any of the conditional expressions represented as the expressions (1) and (2) described above. Accordingly, the width and the height (depth) close to those of the groove formed by cutting work on actual metal can be reproduced in the grooves 4. Thus, when the decorative part 1 and the vehicle display device 100 are configured by arranging the metal thin film 3 on the surface of the substrate body 2 as a resin mold, a texture close to actual metal can be reproduced even with the resin mold as described above while reducing fluctuation in quality. For example, with the decorative part 1 and the vehicle display device 100, production cost can be suppressed as compared with a case of machining the decorative part 1 one by one, and a weight thereof can be reduced as compared with a case of manufacturing the entire decorative part 1 with metal, so that the weight of the vehicle can be reduced. Thus, the decorative part 1 and the vehicle display device 100 can reduce the cost and the weight. As a result, the decorative part 1 and the vehicle display device 100 can properly secure a metallic texture recognized by a viewer with the configuration in which the metal thin film 3 is arranged on the surface of the substrate body 2 made of resin.

In the decorative part 1 (dial plate 117) described above, the grooves 4 are formed so that the distribution width of the width W is equal to or larger than 1.2 μm, and the distribution width of the height H is equal to or larger than 0.3 μm. Accordingly, the decorative part 1 (dial plate 117) and the vehicle display device 100 can create a random sense on the shape of the grooves 4, so that the radial mark pattern 6 or the spin mark pattern 7 configured by the grooves 4 does not seem artificial, and a texture closer to actual metal can be achieved even with the resin mold.

In the decorative part 1 (dial plate 117) described above, the grooves 4 include the through groove 41 formed to linearly extend and pass through the predetermined formation region 10, and the blocked groove 42 formed to linearly extend in which at least one end thereof is blocked in the formation region 10. Accordingly, the decorative part 1 (dial plate 117) and the vehicle display device 100 can give fluctuation to the grooves 4 and create a random sense by mixing the through groove 41 and the blocked groove 42 as the grooves 4 configuring the radial mark pattern 6, so that the radial mark pattern 6 configured by the grooves 4 does not seem artificial, and a texture closer to actual metal can be achieved even with the resin mold.

In the decorative part 1 (dial plate 117) described above, the grooves 4 include the main curved groove 43 that is formed in an arc shape or a circular shape and extends so that the sum of central angles is equal to or larger than 360°, and the auxiliary curved groove 44 that is formed in an arc shape and extends so that the sum of central angles is smaller than 360°. Accordingly, the decorative part 1 (dial plate 117) and the vehicle display device 100 can give fluctuation to the grooves 4 and create a random sense by mixing the main curved groove 43 and the auxiliary curved groove 44 as the grooves 4 configuring the spin mark pattern 7, so that the spin mark pattern 7 configured by the grooves 4 does not seem artificial, and a texture closer to actual metal can be achieved even with the resin mold.

Additionally, in the decorative parts 1 (dial plates 117) described above, the substrate body 2 is molded to contain cycloolefin polymer resin and the metal thin film 3 is formed to contain titanium. Consequently, the decorative parts 1 and the vehicle display device 100 enables a combination of the substrate body 2 and the metal thin film 3 to achieve, for example, favorable transfer performance in the substrate body 2 constituting the decorative parts 1, the ability to follow the profile through machinability and thinning of the metal thin film 3 constituting the decorative parts 1, and favorable adhesion between the substrate body 2 and the metal thin film 3. Molded to contain the cycloolefin polymer resin, the substrate body 2 enables any desired shape required by, for example, the different parts of the dial plates 117 and the grooves 5 in accordance with the shape of the grooves 4 that constitute the radial mark pattern 6 and the spin mark pattern 7 that are formed in the molding surface of the mold die, to be faithfully transferred from the molding surface to the surface of the substrate body 2. Formed using titanium, permits thin film deposition by sputtering, the metal thin film 3 allows film thickness to be made relatively thin, and enables the grooves 4 that constitute the radial mark pattern 6 and the spin mark pattern 7 to be formed, faithfully in the form required by the conditional expressions (1) and (2), and the like, without the need to fill the grooves 5 formed in the surface of the substrate body 2. Moreover, sufficient adhesion can be achieved between the substrate body 2 and the metal thin film 3, so that the metal thin film 3 can be prevented from being peeled from the substrate body 2. Also in the foregoing respect, the decorative parts 1 and the vehicle display device 100 can appropriately gain metallic texture to be given to the viewer in the configuration of the metal thin film 3 formed on the surface of the substrate body 2 formed of resin.

It is understood that the metallic decorative part for a vehicle display device and the vehicle display device according to the embodiment described above are for illustrative purpose only and are not limiting and that various changes may be made without departing from the scope described in the appended claims.

It has been described above that the decorative parts 1 are applied to the dial plates 117 that are incorporated in, for example, the speedometer 102, the fuel indicator 103, the tachometer 104, and the coolant temperature indicator 105, but are not limiting. The decorative parts 1 may be applied, in the vehicle display device 100, to other ornamental members for portions that are exposed on the front surface side in the depth direction and visible from the occupants including the driver. The decorative parts 1 may be applied to annular ornamental members (ring members) disposed around, for example, the facing 112, the speedometer 102, the fuel indicator 103, the tachometer 104, and the coolant temperature indicator 105.

It has been described above that the dial plates 117 have the radial mark pattern 6 applied to the surface of the speedometer main scale section 121 and the fuel indicator disc section 127, and the spin mark pattern 7 applied to the surface of the speedometer character display section 124 and the fuel indicator scale section 128. The foregoing is, however, illustrative only and not limiting. For example, the dial plates 117 may be provided with any pattern other than the radial mark pattern 6 and the spin mark pattern 7, by the grooves 4. For example, the dial plates 117 may be provided with a hairline mark pattern having vertical stripes formed by the grooves 4, a hairline mark pattern having lateral stripes formed by the grooves 4, or a mark pattern having vertical stripes crossing lateral stripes.

It has been described above that the cycloolefin polymer resin is used as the synthetic resin that forms the substrate body 2, titanium is used as the metal that forms the metal thin film 3, and the sputtering is employed to deposit the metal thin film 3 on the surface of the substrate body 2. The foregoing is, however, illustrative only and not limiting. The substrate body 2 may be molded to contain, for example, an acrylic resin or a polycarbonate (PC) resin. The metal thin film 3 may be formed to contain, for example, aluminum, stainless steel, gold, silver, platinum, copper, zinc, nickel, chrome, tin, or molybdenum. Vapor deposition, for example, may be employed as the film deposition process to deposit the metal thin film 3 on the surface of the substrate body 2.

In the above description, the "3D measurement laser microscope LEXT OLS4000 manufactured by Olympus Corporation" is used as the measurement equipment for measuring the width W and the height H. However, the embodiment is not limited thereto, and other measurement equipment may be used. In such a case, it is sufficient that a predetermined measurement condition set in advance for measuring the width W and the height H is equivalent to the above measurement condition.

EXAMPLES

FIG. 9 is a table illustrating results of a sensory evaluation test of the dial plate according to the embodiment. The following describes the sensory evaluation test of the dial plate 117 configured as the decorative part 1 with reference to FIG. 9.

In the present sensory evaluation test, the dial plate 117 configured as the decorative part 1 according to the embodiment described above is actually made so that the width W and the height H satisfy any of the conditional expressions represented as the expressions (1) and (2). In a "first example", the grooves 4 are formed so that all widths W are equal to or larger than 0.331 μm and equal to or smaller than 2.653 μm, all heights H are equal to or larger than 0.007 μm and equal to or smaller than 0.316 μm, and the expressions (1) and (2) are satisfied. In a "second example", the grooves 4 are formed so that all widths W are equal to or larger than 0.280 μm and equal to or smaller than 1.439 μm, all heights H are equal to or larger than 0.006 μm and equal to or smaller than 0.310 μm, and the expressions (1) and (2) are satisfied. In a "first comparative example", a "second comparative example", and a "third comparative example", the dial plate 117 is actually made so that the width W and the height H do not satisfy any of the conditional expressions represented as the expressions (1) and (2) described above. In the "first comparative example", the grooves 4 are formed so that all the widths W are equal to or larger than 43.84 μm and equal to or smaller than 199.3 μm, all the heights H are equal to or larger than 10.17 μm and equal to or smaller than 18.07 μm, and at least the width W and the height H not satisfying the expressions (1) and (2) are included. In the "second comparative example", the grooves 4 are formed so that all the widths W are larger than 0 and equal to or smaller than 82.34 μm, all the heights H are larger than 0 and equal to or smaller than 1.053 μm, and at least the width W and the height H not satisfying the expressions (1) and (2) are included. In the "third comparative example", the grooves 4 are formed so that all the widths W are equal to or larger than 2.853 μm and equal to or smaller than 75.93 μm, all the heights H are equal to or larger than 0.225 μm and equal to or smaller than 1.195 μm, and at least the width W and the height H not satisfying the expressions (1) and (2) are included. In the "first example", the "second example", the "first comparative example", the "second comparative example", and the "third comparative example", similarly to the embodiment described above, a cycloolefin polymer resin is used as a synthetic resin configuring the substrate body 2, titanium is used as metal configuring the metal thin film 3, and the metal thin film 3 is deposited on the surface of the substrate body 2 by sputtering. As the widths W and the heights H in the "first example", the "second example", the "first comparative example", the "second comparative example", and the "third comparative example", used are the measurement values measured in Step 1 to Step 4 using the "3D measurement laser microscope LEXT OLS4000 manufactured by Olympus Corporation". Actually made is a dial plate made with a similar configuration using real metal on which a plurality of grooves configuring the radial mark pattern 6 and the spin mark pattern 7 are formed by cutting work, and each width W and each height H are measured using a similar method for the real metal. In this case, the width W is equal to or larger than 0.337 μm and equal to or smaller than 1.562 μm, and the height H is equal to or larger than 0.007 μm and equal to or smaller than 0.611 μm.

The sensory evaluation test was conducted for the "first example", the "second example", the "first comparative example", the "second comparative example", and the "third comparative example", as evaluation objects using the following procedure. Specifically, evaluators made a sensory evaluation of metallic texture of each of the evaluation objects on the basis of their experience, when the evaluation objects and the present metal were placed in: (A-1) a room having no extraneous light and at predetermined positions within a prototype of the vehicle display device 100 illustrated in FIG. 1 in juxtaposition with each other; (A-2) a room having extraneous light and at predetermined positions within the prototype of the vehicle display device 100 illustrated in FIG. 1 in juxtaposition with each other; (B-1) a room having no extraneous light, and at predetermined positions within a box having an acrylic top plate (something like an exhibition case) in juxtaposition with each other and with all areas surrounding all but the evaluation objects covered in a black cloth; and (B-2) a room having extraneous light, and at predetermined positions within a box having an acrylic top plate in juxtaposition with each other and with all areas surrounding all but the evaluation objects covered in a black cloth. The evaluators finally made an overall evaluation for a combination of all of (A-1), (A-2), (B-1), and (B-2). The evaluation value was rated as "100" when sufficient metallic texture was sensed with no deliberate intention evident to achieve the sufficient metallic texture as compared with the present metal, and rated as "less than 100" when sufficient metallic texture was not sensed with some deliberate intention evident to achieve the sufficient metallic texture as compared with the present metal. Greater evaluation values above "100" signify an increasing sense of metallic texture, and smaller evaluation values below "100" signify a decreasing sense of metallic texture. Designers of the vehicle display devices (meters) formed a group of five evaluators and the evaluation value was an average value of the evaluation values rated by the five evaluators. The sensory evaluation test was conducted for each of the evaluation objects.

As a result of the sensory evaluation test, as is clear from FIG. 9, an evaluation value in the "first comparative example" is "80", the evaluation value in the "second comparative example" is "85", and the evaluation value in the "third comparative example" is "90", which seem artificial as compared with metal and a sufficient metallic texture is not obtained. In contrast, the evaluation value in the "first example" is "110", and the evaluation value in the "second example" is "120", which do not seem artificial even being compared with the real metal, and a sufficient metallic texture is obtained. Additionally, in the "first example" and the "second example", a metallic texture is obviously increased as each width W and each height H are caused to be relatively small within a range that can be visually recognized, and the metallic texture in the "second example" is obviously higher than that in the "first example". As described above, in the "first example" and the "second example", the metallic texture recognized by the viewer can be properly secured and a metallic appearance can be obtained with the configuration in which the metal thin film 3 is arranged on the surface of the substrate body 2 made of resin.

In a metallic decorative part for a vehicle display device and the vehicle display device according to the embodiments, a plurality of grooves are formed on a surface of a metal thin film in accordance with a shape of a surface of a substrate body formed by resin molding so that the width is larger than 0 and equal to or smaller than 3.0 μm, and the height is larger than 0 and equal to or smaller than 1.0 μm. Accordingly, the width and the height (depth) close to those of a groove formed by cutting work on actual metal can be reproduced in the above grooves. Due to this, by configuring the metallic decorative part for a vehicle display device and the vehicle display device such that the metal thin film is arranged on the surface of the substrate body as a resin mold, fluctuation in quality can be reduced and a texture close to actual metal can be reproduced even for the resin mold described above. As a result, with the configuration of the metallic decorative part for a vehicle display device and the vehicle display device in which the metal thin film is arranged on the surface of the substrate body made of resin, a metallic texture recognized by a viewer can be properly secured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A metallic decorative part for a vehicle display device, the metallic decorative part comprising:
    a substrate body made from a synthetic resin and that includes a first plurality of grooves in a surface of the substrate body; and
    a metal thin film that is formed of metal and deposited on the surface of the substrate body and that includes a second plurality of grooves on a surface of the metal thin film that correspond to the first plurality of grooves of the surface of the substrate body, wherein
    the second plurality of grooves are formed so that a width between bottom points of the second plurality of grooves that are adjacent to each other is larger than 0 and equal to or smaller than 3.0 μm, and a height of an apex between the adjacent grooves from lower one of the bottom points of the adjacent grooves is larger than 0 and equal to or smaller than 1.0 μm,
    the second plurality of grooves are formed so that a distribution width of the width is equal to or larger than 1.2 μm, and a distribution width of the height is equal to or larger than 0.3 μm, and
    the second plurality of grooves forms a radial mark pattern, and the radial mark pattern is formed by the second plurality of grooves extending radially from a preset reference point or a point nearby the preset reference point outwardly.

2. The metallic decorative part for a vehicle display device according to claim 1, wherein
    the second plurality of grooves are formed so that the width is larger than 0 and equal to or smaller than 2.7 μm, and the height is larger than 0 and equal to or smaller than 0.35 μm.

3. The metallic decorative part for a vehicle display device according to claim 1, wherein
    the second plurality of grooves include a first linear groove formed to linearly extend and pass through a predetermined formation region, and a second linear groove formed to linearly extend in which at least one end of the second linear groove is blocked in the formation region.

4. The metallic decorative part for a vehicle display device according to claim 2, wherein
    the second plurality of grooves include a first linear groove formed to linearly extend and pass through a predetermined formation region, and a second linear groove formed to linearly extend in which at least one end of the second linear groove is blocked in the formation region.

5. A vehicle display device comprising:
    a display unit that displays information relating to a vehicle; and
    a metallic decorative part that includes a substrate body made from a synthetic resin and that includes a first plurality of grooves in a surface of the substrate body, and a metal thin film that is formed of metal and deposited on the surface of the substrate body and that includes a second plurality of grooves on a surface of the metal thin film that correspond to the first plurality of grooves of the surface of the substrate body, wherein
    the second plurality of grooves are formed so that a width between bottom points of the second plurality of grooves that are adjacent to each other is larger than 0 and equal to or smaller than 3.0 μm, and a height of an apex between the adjacent grooves from lower one of the bottom points of the adjacent grooves is larger than 0 and equal to or smaller than 1.0 μm,
    the second plurality of grooves are formed so that a distribution width of the width is equal to or larger than 1.2 μm, and a distribution width of the height is equal to or larger than 0.3 μm, and
    the second plurality of grooves forms a radial mark pattern, and the radial mark pattern is formed by the second plurality of grooves extending radially from a preset reference point or a point nearby the preset reference point outwardly.

* * * * *